(12) United States Patent
Lam et al.

(10) Patent No.: US 11,646,792 B2
(45) Date of Patent: *May 9, 2023

(54) OPTICAL COMMUNICATIONS TERMINAL

(71) Applicant: NORTHROP GRUMMAN SYSTEMS CORPORATION, Falls Church, VA (US)

(72) Inventors: Daniel W Lam, Gardena, CA (US); James M Zamel, Rolling Hills Estates, CA (US); Arthur B O'Connor, Tucson, AZ (US); Donald G Heflinger, Torrance, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/818,515

(22) Filed: Aug. 9, 2022

(65) Prior Publication Data

US 2022/0393760 A1 Dec. 8, 2022

Related U.S. Application Data

(63) Continuation of application No. 17/199,931, filed on Mar. 12, 2021, now Pat. No. 11,444,691.

(51) Int. Cl.
*H04B 10/11* (2013.01)
*G02B 27/28* (2006.01)
(Continued)

(52) U.S. Cl.
CPC ........... *H04B 10/11* (2013.01); *G02B 27/141* (2013.01); *G02B 27/285* (2013.01); *G02B 27/286* (2013.01); *H04B 10/532* (2013.01)

(58) Field of Classification Search
CPC .... H04B 10/11; H04B 10/532; G02B 27/141; G02B 27/286; B02B 27/286
(Continued)

(56) References Cited

U.S. PATENT DOCUMENTS 5,530,577 A 6/1996 Orino et al.
6,359,712 B1 3/2002 Kamitani
(Continued)

FOREIGN PATENT DOCUMENTS

CN 210780813 U 6/2020

OTHER PUBLICATIONS

Samuel et al ;Circular polarization and Availability in Free Space Optics Systems; 2010; IEEE; pp. 1-6. (Year: 2010).*
(Continued)

*Primary Examiner* — Amritbir K Sandhu
(74) *Attorney, Agent, or Firm* — John A. Miller; Shumaker, Loop & Kendrick, LLP

(57) ABSTRACT

An optical communications terminal including a polarizing element responsive to a first linearly polarized optical beam and rotating the first linearly polarized optical beam in a first linear direction, a beam separator responsive to and passing the first linearly polarized optical beam, and a circular polarizing element responsive to the first linearly polarized optical beam from the beam separator and circularly polarizing the first linearly polarized optical beam for transmission, where the circular polarizing element is switchable between two orthogonal switching states. The terminal receives a circularly polarized optical beam from another terminal and linearly polarizes the circularly polarized optical beam from the other terminal in a second linear direction that is orthogonal to the first linear direction and the beam
(Continued)

separator directs the circularly polarized optical beam from the other terminal in a direction away from the polarizing element.

18 Claims, 2 Drawing Sheets

(51) Int. Cl.
*H04B 10/532* (2013.01)
*G02B 27/14* (2006.01)

(58) Field of Classification Search
USPC .......................................................... 398/118
See application file for complete search history.

(56) References Cited

U.S. PATENT DOCUMENTS

| | | | |
|---|---|---|---|
| 7,277,641 B1 | 10/2007 | Gleckman | |
| 7,675,684 B1 * | 3/2010 | Weissman | G02B 27/0172 359/633 |
| 11,009,595 B1 * | 5/2021 | Carlson | G02B 27/283 |
| 11,444,691 B2 * | 9/2022 | Lam | H04B 10/1123 |
| 2006/0002247 A1 * | 1/2006 | Kim | G11B 7/1374 369/44.37 |
| 2009/0122402 A1 * | 5/2009 | Shemo | G02B 5/3083 359/486.02 |
| 2011/0007279 A1 * | 1/2011 | Silverstein | H04N 13/337 353/8 |
| 2014/0175267 A1 * | 6/2014 | Thiel | H04B 10/11 359/326 |
| 2015/0251273 A1 * | 9/2015 | Tayebati | B23K 26/38 219/121.72 |
| 2016/0056606 A1 * | 2/2016 | Chuang | G01N 21/9501 372/5 |
| 2017/0052381 A1 * | 2/2017 | Huang | G02B 27/0927 |
| 2018/0239146 A1 * | 8/2018 | Bierhuizen | G02B 5/20 |
| 2021/0152681 A1 * | 5/2021 | Yoon | H04N 23/56 |

OTHER PUBLICATIONS

Polarization Effects in Optical Free Space Communications; E.B. Gindele and T.L. Miller; 6 pages; 1986 IEEE.

* cited by examiner

OPTICAL COMMUNICATIONS TERMINAL

CROSS-REFERENCE TO RELATED APPLICATIONS

This application claims the benefit of the filing date of U.S. Utility application Ser. No. 17/199,931, titled, Optical Free Space Communication Apparatus Using Polarization, filed Mar. 12, 2021, which claims the benefit of U.S. Provisional Application 63/115,764, titled, Optical Free Space Communication Apparatus Using Polarization, filed Nov. 19, 2020.

BACKGROUND

Field

This disclosure relates generally to an optical communications terminal and, more particularly, to an optical communications terminal that uses polarized optical beams to allow transmission between terminals at the same beam wavelength.

Discussion of the Related Art

Optical communications systems, such as those employed by some satellites, transmit optical signals that contain data and other information between communications terminals on a communications link. The optical signals transmitted by a communications terminal need to be isolated from the optical signals received by the terminal so as to prevent cross-talk therebetween. Further, it is often desirable to limit the number of terminals that are employed in a certain system. Typically this is accomplished by transmitting the optical signals from the terminal at one frequency and receiving optical signals from another terminal at a different frequency along a common boresight between the terminals, where filters and other optical components are employed in the terminals to separate the signals. However, these components that are necessary to separate the signals add size, cost and weight to the overall system. Further, because of these filters and components, each terminal will always need to transmit and receive signals at set wavelengths, which prevents more than two communications terminals at more than two different locations from communicating each other.

DETAILED DESCRIPTION OF THE EMBODIMENTS

The following discussion of the embodiments of the disclosure directed to an optical communications system that uses polarized beams to allow transmission between communications terminals at the same beam wavelength is merely exemplary in nature, and is in no way intended to limit the disclosure or its applications or uses.

Figure 1:
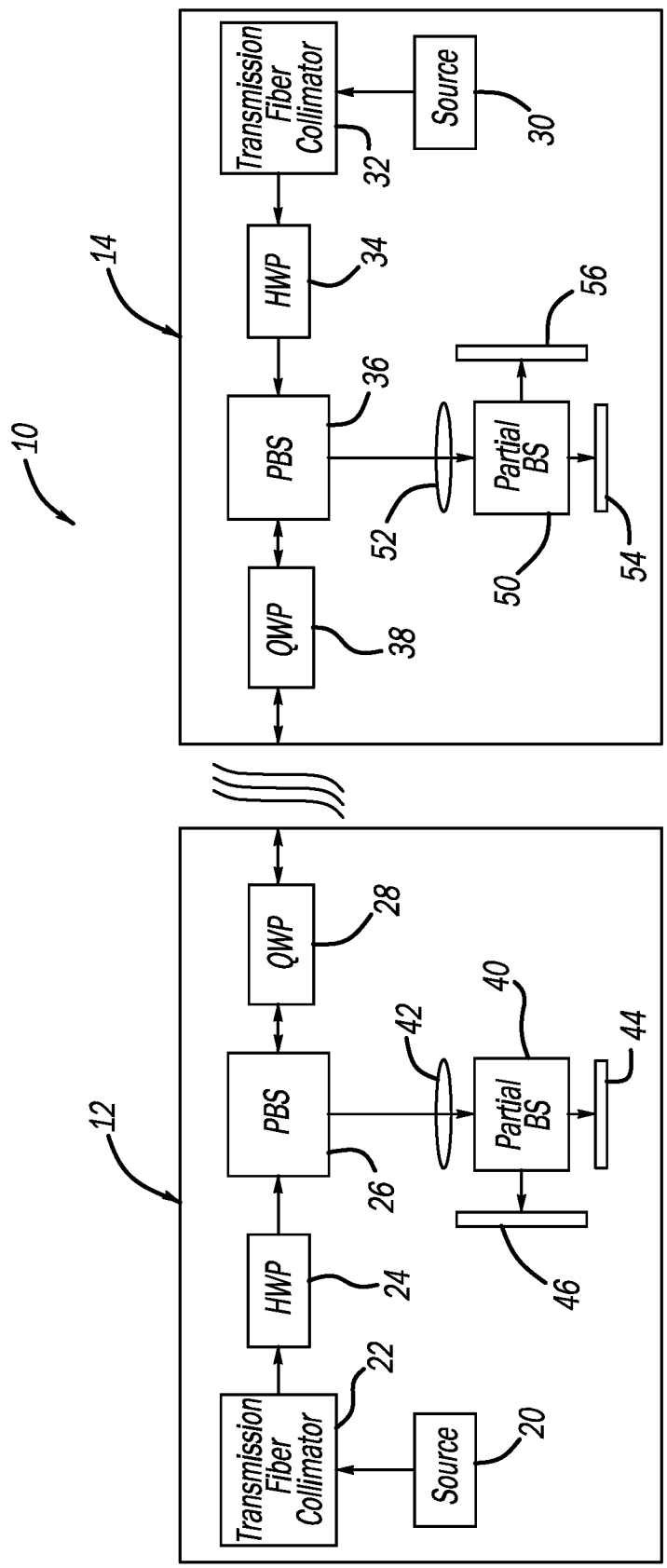
FIG. 1 is a schematic block diagram of an optical communications system including two communications terminals in communication with each other using beams having the same wavelength, but different polarizations, where the same wavelength beam is used for both terminal acquisition and information extraction.

FIG. 1 is a schematic block diagram of an optical communications system 10 including a first communications terminal 12 at one location and a second communications terminal 14 at another location that are in optical communications with each other, where the terminals 12 and 14 can be ground-based terminals or on any suitable platform, such as satellites, aircraft, ships, etc. The terminals 12 and 14 are intended to represent any optical communications terminal that transmit and receive optical signals for any communications purpose. It is noted that none of the components are shown for signal modulation and processing in the terminals 12 and 14, where those components can be any suitable components and would be well understood by those skilled in the art.

The terminal 12 includes an optical source 20 that generates a linearly polarized optical beam having wavelength $\lambda_1$ to be transmitted and provides the beam to a transmission fiber collimator 22. The optical beam from the transmission fiber collimator 22 is sent to a polarizer 24, such as a half-wave plate (HWP) polarizer, that rotates the polarized beam from the fiber collimator 22 in, for example, a P pol direction. The linearly polarized beam is sent to a beam separator 26, such as a polarization beam splitter (PBS), for example, a crystal Brewster angle prism, that passes light straight through in one linearly polarized direction, here the P pol direction, and reflects light that is linearly polarized in an orthogonal direction, such as an S Pol direction. The linearly polarized P pol beam that passes through the beam separator 26 is rotated by a circular polarizing element 28, such as a quarter-wave plate (QWP) polarizer, to be circularly polarized, for example, right hand circularly polarized, and the circularly polarized beam is transmitted to the terminal 14 through free space. It is noted that propagation of the beams through the terminal 12 could be done completely in fiber, where the beam separator 26 could be an optical circulator. Thus, all or some of the polarization control and isolation can be performed within fiber components or free-space components.

Likewise, the terminal 14 includes an optical source 30 that generates an optical beam also having wavelength $\lambda_1$ to be transmitted and provides the beam to a transmission fiber collimator 32. The optical beam from the transmission fiber collimator 32 is sent to a polarizer 34, such as an HWP polarizer, that rotates the polarized beam from the collimator 32 also in, for example, the P pol direction. The linearly polarized beam is sent to a beam separator 36, such as a polarization beam splitter, for example, a crystal Brewster angle prism, that passes light straight through in one linearly polarized direction, here the P pol direction, and reflects light that is linearly polarized in an orthogonal direction, such as the S pol direction. The linearly polarized P pol beam that passes through the beam separator 36 is rotated by a circular polarizing element 38, such as a QWP polarizer, to be circularly polarized, for example, left hand circularly polarized, and the circularly polarized beam is transmitted to the terminal 12 through free space.

The optical beam transmitted by the terminal 12 is received by the circular polarizing element 38 and the optical beam transmitted by the terminal 14 is received by the circular polarizing element 28. The polarization axis of the circular polarizing element 38 is set 90° relative to the polarization axis of the polarizing element 28, where the polarization axis of both of the circular polarizing elements 28 and 38 are switchable between these two orthogonal switching states. Therefore, when the circular polarizing elements 28 or 38 receives the optical beam from the transmitting terminal 14 or 12 it is converted to a linearly polarized beam that is polarized 90° relative to the linear polarization it had before it was converted to a circularly polarized beam in the transmitting terminal 12 or 14. In other words, the switchable orientation states of the circular polarizing elements 28 and 38 that set the orientation of the circular polarizing elements 28 and 38 must be 90° rotated in the receiving terminal 12 or 14 relative to the transmitting terminal 12 or 14, and when the receiving terminal 12 or 14 becomes the transmitting terminal, it must switch this 90° orientation to the original transmitting orientation to enable its transmitted beam to be received by the receiving terminal 12 or 14. This allows the inbound polarization of the optical beam to be orthogonal to the outbound polarization of the optical beam. This can either be done using a mechanically rotating QWP polarizer or a liquid crystal variable retarder to achieve the required phase retardation. The fact that the circular polarizing elements 28 and 38 can be rotated with relatively high tolerance to small angular changes to the incident light passing through the circular polarizing element 28 or 38 without affecting its function in the terminal 12 or 14 enables the circular polarizing element 28 or 38 to be advantageously suited as a gender-switchable element, and enables both mechanical rotation and electronically adjusted liquid crystal retardation to be used for performing this switching function.

The left hand circularly polarized beam transmitted by the terminal 14 is received by the terminal 12 and is linearly polarized by the circular polarizing element 28. Because the polarization axis of the circular polarizing element 38 is set 90° relative to the polarization axis of the circular polarizing element 28, the polarizer 28 polarizes the received beam in the S pol direction that is orthogonal to the P pol direction. The S pol beam is reflected by the beam separator 26 and is directed to a partial beam splitter 40 through a linear polarization filter 42 that filters out any residual light that is not linearly polarized in the S pol direction. The beam splitter 40 splits the beam, and one split beam is sent to a communications sensor 44 to be processed and the information is extracted therefrom and the other split beam is sent to an acquisition sensor 46 to be processed for alignment purposes between the terminals 12 and 14.

Likewise, the right hand circularly polarized beam transmitted by the terminal 12 is received by the terminal 14 and is linearly polarized by the circular polarizing element 38. Because the polarization axis of the circular polarizing element 38 is set 90° relative to the polarization axis of the circular polarizing element 28, the circular polarizing element 38 polarizes the received beam in the S pol direction that is orthogonal to the P pol direction. The S pol beam is reflected by the beam separator 36 and is directed to a partial beam splitter 50 through a linear polarization filter 52 that filters out any residual light that is not linearly polarized in the S pol direction. The beam splitter 50 splits the beam, and one split beam is sent to a communications sensor 54 to be processed and the information is extracted therefrom and the other split beam is sent to an acquisition sensor 56 to be processed for alignment purposes between the terminals 12 and 14.

In the system 10 the same wavelength beam was used for both signal processing and acquisition purposes. However, for some communications systems, the signal intensity may be too low to use the same optical beam for both terminal acquisition and information processing. Further, there may be certain situations where terminals are close together, where one terminal may receive a beam that was intended for the other terminal. In these and other situations it may be desirable to use beams having different wavelengths for signal processing and terminal acquisition.

Figure 2:
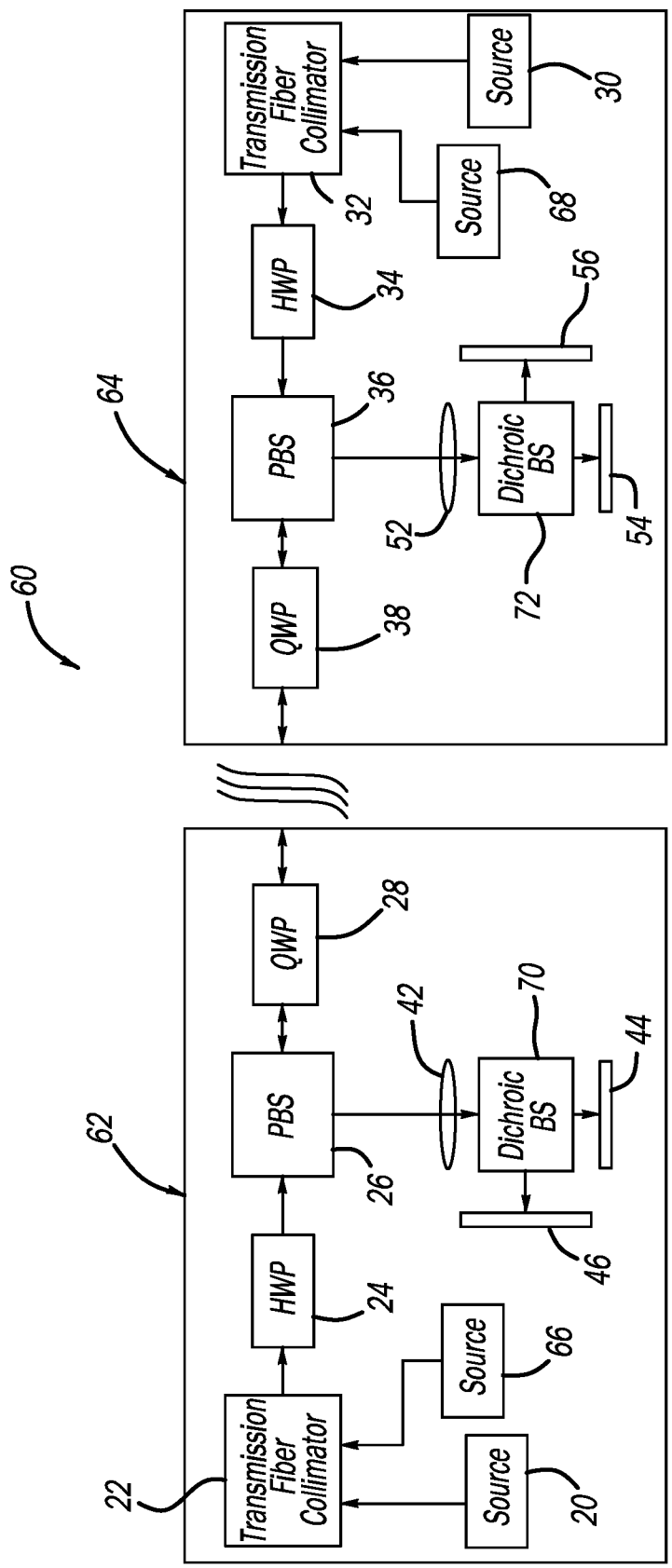
FIG. 2 is a schematic block diagram of an optical communications system including two communications terminals in communication with each other using beams having the same wavelength, but different polarizations, where different wavelength beams are used for terminal acquisition and information extraction.

FIG. 2 is a schematic block diagram of an optical communications system 60 including a first terminal 62 and a second terminal 64 that are in optical communications with each other, where different wavelength beams are used for terminal acquisition and information extraction, or for signal redundancy purposes, and where like elements to the system 10 are identified by the same reference number. In this system 60, a second source 66 in the terminal 62 and a second source 68 in the terminal 64 provide an optical beam at wavelength $A_2$ to the fiber collimators 22 and 32, respectively, that are both processed by the polarizers 24 and 34, the beam separators 26 and 36 and the circular polarizing elements 28 and 38 in the same manner as discussed above. However, the beam received by the terminal 62 and reflected by the beam separator 26 is sent to a dichroic beam splitter 70 that splits the beam based on its wavelength, where the beam having wavelength $\lambda_1$ is sent to the communications sensor 44 and the beam having wavelength $\lambda_2$ is sent to the acquisition sensor 46. Likewise, the beam received by the terminal 64 and reflected by the beam separator 36 is sent to a dichroic beam splitter 72 that splits the beam based on its wavelength, where the beam having wavelength $\lambda_1$ is sent to the communications sensor 54 and the beam having wavelength $\lambda_2$ is sent to the acquisition sensor 56.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. An optical communications terminal comprising:
    a polarizing element responsive to a first linearly polarized optical beam and rotating the first linearly polarized optical beam in a first linear direction;
    a beam separator responsive to and passing the first linearly polarized optical beam; and
    a circular polarizing element responsive to the first linearly polarized optical beam from the beam separator and circularly polarizing the first linearly polarized optical beam for transmission, said circular polarizing element being switchable between two orthogonal switching states, wherein the terminal receives a circularly polarized optical beam from another terminal, said circular polarizing element linearly polarizing the circularly polarized optical beam from the another terminal in a second linear direction that is orthogonal to the first linear direction and said beam separator directing the circularly polarized optical beam from the another terminal in a direction away from the polarizing element.

2. The terminal according to claim 1 further comprising a beam splitter receiving and splitting the circularly polarized optical beam from the beam separator and directing one split beam to a communications sensor and another split beam to an acquisition sensor.

3. The terminal according to claim 2 wherein the beam splitter is a dichroic beam splitter.

4. The terminal according to claim 2 further comprising a linear polarization filter that receives the circularly polarized optical beam from the beam separator before the beam splitter receives the circularly polarized optical beam from the beam separator.

5. The terminal according to claim 1 wherein the polarizing element is responsive to a second linearly polarized optical beam having a second wavelength and rotating the second linearly polarized optical beam in the first linear direction, where the beam separator is responsive to and passes the second linearly polarized optical beam, and the circular polarizing element is responsive to the second linearly polarized optical beam from the beam separator and circularly polarizing the second linearly polarized optical beam for transmission.

6. The terminal according to claim 1 wherein the polarizing element is a half-wave plate (HWP) polarizer.

7. The terminal according to claim 1 wherein the circular polarizing element is a mechanically rotating quarter-wave plate (QWP) polarizer.

8. The terminal according to claim 1 wherein the circular polarizing element is a liquid crystal variable retarder.

9. The terminal according to claim 1 wherein the beam separator is a crystal Brewster angle prism.

10. The terminal according to claim 1 wherein the first linear direction is a P pol direction and the second linear direction is an S pol direction.

11. The terminal according to claim 1 wherein the two orthogonal switching states are right hand circular polarization and left hand circular polarization.

12. An optical communications terminal comprising:
a half-wave plate (HWP) polarizer responsive to a first linearly polarized optical beam and rotating the first linearly polarized optical beam in a P pol direction;
a beam separator responsive to and passing the first linearly polarized optical beam; and
a circular polarizing element responsive to the first linearly polarized optical beam from the beam separator and circularly polarizing the first linearly polarized optical beam for transmission, said circular polarizing element being switchable between a right hand circular polarization state and left hand circular polarization state, wherein the terminal receives a circularly polarized optical beam from another terminal, said circular polarizing element linearly polarizing the circularly polarized optical beam from the another terminal in an S pol direction and said beam separator directing the circularly polarized optical beam from the another terminal in a direction away from the polarizing element.

13. The terminal according to claim 12 further comprising a beam splitter receiving and splitting the circularly polarized optical beam from the beam separator and directing one split beam to a communications sensor and another split beam to an acquisition sensor.

14. The terminal according to claim 13 wherein the beam splitter is a dichroic beam splitter.

15. The terminal according to claim 13 further comprising a linear polarization filter that receives the circularly polarized optical beam from the beam separator before the beam splitter receives the circularly polarized optical beam from the beam separator.

16. The terminal according to claim 12 wherein the circular polarizing element is a mechanically rotating quarter-wave plate (QWP) polarizer.

17. The terminal according to claim 12 wherein the circular polarizing element is a liquid crystal variable retarder.

18. The terminal according to claim 12 wherein the beam separator is a crystal Brewster angle prism.

* * * * *